United States Patent

[11] 3,630,547

[72] Inventor William I. Hartshorn, Jr.
356 Cienaga Drive, Fullerton, Calif. 92632
[21] Appl. No. 12,740
[22] Filed Feb. 19, 1970
[45] Patented Dec. 28, 1971

[54] COMBINATION WASTE AND VENT FITTING FOR ABOVE FLOOR MOUNTING
1 Claim, 5 Drawing Figs.

[52] U.S. Cl. .................................................. 285/150
[51] Int. Cl. ............................................... F16l 41/00
[50] Field of Search ............................................. 285/150, 153, 155, 156

[56] References Cited
UNITED STATES PATENTS

| | | | |
|---|---|---|---|
| 1,093,626 | 4/1914 | Hulbert | 285/150 |
| 1,483,891 | 2/1924 | Kennedy | 285/150 |
| 1,501,225 | 7/1924 | MacDonald | 285/150 |
| 1,629,208 | 5/1927 | Ernst | 285/150 |
| 1,759,321 | 5/1930 | Oldfield | 285/153 |
| 2,499,900 | 3/1950 | Bouldin | 285/150 |

FOREIGN PATENTS

| | | | |
|---|---|---|---|
| 19,237 | 1891 | Great Britain | 285/155 |
| 285,491 | 1931 | Italy | 285/150 |
| 1,015,825 | 1966 | Great Britain | 285/423 |

Primary Examiner—Andrew V. Kundrat
Attorney—Whann & McManigal

ABSTRACT: A combination waste and vent fitting of plastic material for use in a baseboard above the floor plumbing system, which can be vertically or horizontally mounted and in a single fitting connects a plurality of waste connections with a single drain connection, and which will, when connected, have a common vent connection.

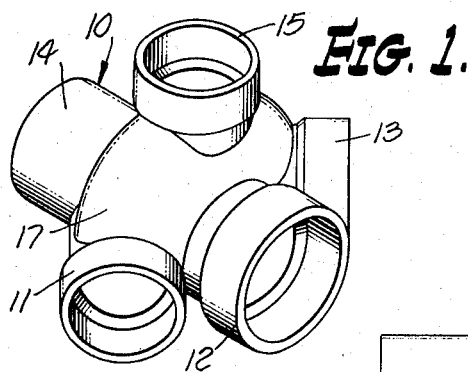

WILLIAM I. HARTSHORN, JR.
INVENTOR
WHANN & McMANIGAL
Attorneys for Applicant
BY

COMBINATION WASTE AND VENT FITTING FOR ABOVE FLOOR MOUNTING

BACKGROUND OF THE INVENTION

The present invention relates generally to plumbing pipe connectors.

Heretofore, and particularly in above the floor type of plumbing system, there has been no single fitting which will permit economical installation in connection with horizontal runs, and whereby a plurality of inflow waste connections may be connected at a common point by a gradient run with a main drain and at the same time secure a common vent at the common point of waste connections.

The Hulbert U.S. Pat. No. 1,093,626 and Grigg U.S. Pat. No. 1,145,679 are exemplary of the heretofore double-Y-types of fittings, but in the fittings of these patents, individual vent connections are provided for the separate branches rather than a common vent connection.

The fitting of the present invention is particularly well adapted for use in cement slab low-cost modular housing constructions in which the plumbing system is located above the floor line and connects with a main drain in the cement slab.

In the fitting, as subsequently described in detail, it is one feature that the fitting is formed with an internal venting cavity which provides vent connections between the waste branches and a common vent connection.

Moreover, the fitting of the present invention also is unique in that the side branch connections have a gradient flow axis to provide for drainage.

SUMMARY OF THE INVENTION

The present invention relates generally to pipe connectors, and is more particularly concerned with a combination plumbing fitting of such construction as to more economically permit the connection of a plurality of waste lines to a single main drain, and which will, when connected, have a common vent.

It is therefore an object of the present invention to provide a composite plumbing fitting for above the floor-type plumbing system, which may be installed as a single unit in a small space to provide a localized concentrated connection for a plurality of waste flows with a main drain and common vent.

A further object is to provide a unitary fitting in which a plurality of angularly diverging waste branch connections are connected with a common drain connection, and which incorporates a common vent connection in communication with the branch connections through an internal cavity formed in the body of the fitting.

Another object is to provide a fitting as stated above, wherein certain of the branch connections have a gradient flow axis for drainage.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a perspective view of a fitting embodying the features of the present invention;

FIG. 2 is a top plan view of the same;

FIG. 3 is a side elevational view;

DESCRIPTION OF THE PREFERRED EMBODIMENT

Referring generally to the drawings, for illustrative purposes, the fitting of the present invention is disclosed as embodying a tubular body 10 which is terminated at one end into a plurality of angularly extending inlet connections 11, 12 and 13, and at its other end in a single connection 14.

Intermediate the respective ends of the fitting, there is provided a branch connection 15.

The fitting is arranged to be installed in either a vertical or horizontal position, depending upon the installation requirements. In a horizontal position, the connection 15 will be upwardly disposed. As so installed, the connections 11, 12 and 13, which are in diverging angular relation, will provide inlet waste connections from a plurality of plumbing fixtures and devices at various points of the plumbing system. The connection 15 is arranged with its axis disposed normally to the main flow axis, and due to the angular relationship of the branch connections, communication is established with the single outlet connection 14 which is arranged to be connected to a main drain, usually through a lateral run along the floor line.

Although the waste connections are shown as being arranged to form a double substantially 45° Y, it will be appreciated that the fitting may be formed with a single Y within the broad concepts of the present invention.

Figure 4:
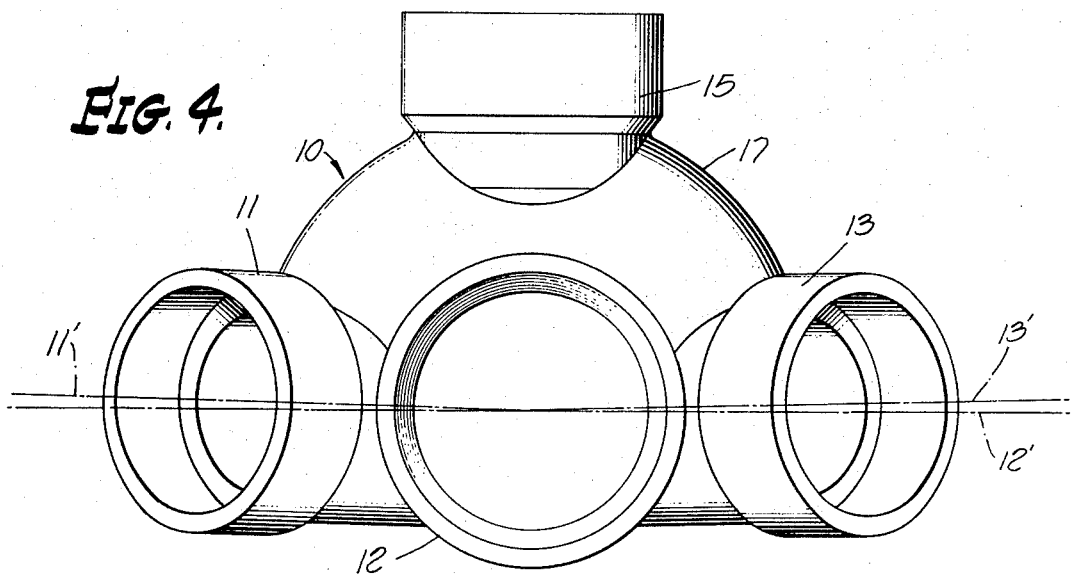
FIG. 4 is an end elevational view, as seen from the right end as disclosed in FIG. 3.

With the fitting installed in a horizontal position, it is important that proper drainage be provided, particularly in the side branch connections 11 and 13, when the main flow axis through the branch connection 12 is installed on a slight gradient. As best shown in FIG. 4, the flow axes of branches 11 and 13, as indicated at 11' and 13', are respectively inwardly downwardly inclined with respect to a transverse plane 12' taken through the flow axis of the connection 12.

Figure 5:
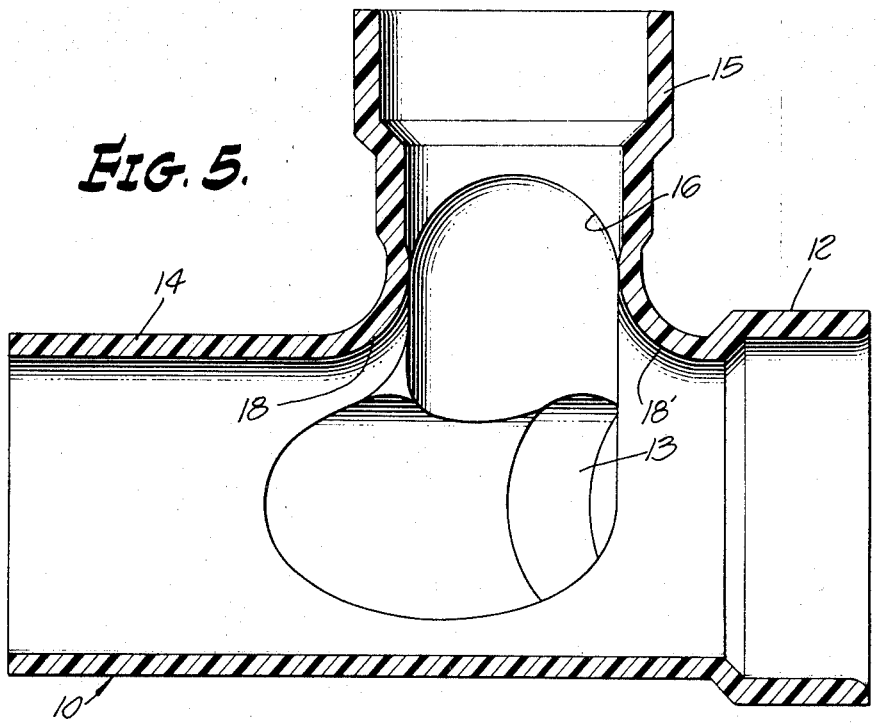
FIG. 5 is an enlarged longitudinal vertical sectional view, taken substantially on line 5—5 of FIG. 2.

The connection 15 is so arranged as to be connectable so as to form a vent common to the respective branch connections and the main drain connection. For this purpose, the connection 15 has an entrance flow communication with an internal cavity 16 formed by a bulged wall 17, which is outwardly offset with respect to the main flow channel through the branch connection 12 to the main drain connection 14. The internal cavity 16 provides an elongate communicating venting channel between the respective branch connections 11 and 13 and the vent connection 15. Connection of the cavity forming wall with the branches is by means of sanitary sweeps, and is indicated in FIG. 5 by the numerals 18 and 18' in the case of the vent connection 15. This becomes an important factor, when the fitting is vertically installed with the connection 12 uppermost.

The fitting may be constructed of any material, but has been described herein as comprising a suitable plastic, and while the various connections have been shown as being provided with female slip joint terminal connections, it is to be appreciated that other types of connections may be utilized if desired.

Various modifications may suggest themselves to those skilled in the art without departing from the spirit of my invention, and hence, I do not wish to be restricted to the specific forms shown or uses mentioned, except to the extent indicated in the appended claim.

I claim:

1. A unitary combination plumbing fitting arranged for mounting in a vertical or a horizontal position to provide a common vent connection with a plurality of waste connections to a main drain connection, said fitting comprising:
   A. a main tubular body,
      a. one end of said body being formed with a plurality of inlet connections having angularly outwardly diverging axes positioned to provide a central main drain inlet, and a branch waste inlet on each side of the main drain inlet,
      b. the other end of said body being formed to provide a main drain outlet connection;
   B. a branch connection extending from the juncture of said inlet and outlet connections in a direction normal to said main body axis; and
   C. a bulged wall portion on said main body providing an internal cavity which forms an offset channel connection between the inlet connections and the branch connection.

* * * * *